United States Patent
Wabgaonkar et al.

(10) Patent No.: US 9,747,498 B2
(45) Date of Patent: *Aug. 29, 2017

(54) BIOMETRIC RECOGNITION

(71) Applicant: Accenture Global Services Limited, Dublin (IE)

(72) Inventors: Harshawardhan Madhukar Wabgaonkar, Bangalore (IN); Sanjoy Paul, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,305

(22) Filed: Feb. 12, 2016

(65) Prior Publication Data

US 2016/0196469 A1  Jul. 7, 2016

Related U.S. Application Data

(63) Continuation of application No. 14/260,986, filed on Apr. 24, 2014, now Pat. No. 9,262,675.

(30) Foreign Application Priority Data

Apr. 24, 2013 (IN) .............................. 1791CHE2013

(51) Int. Cl.
  *G06K 9/00* (2006.01)
  *G06K 9/62* (2006.01)
  *G06K 9/46* (2006.01)
  *G06K 9/78* (2006.01)

(52) U.S. Cl.
  CPC ....... *G06K 9/00382* (2013.01); *G06K 9/4652* (2013.01); *G06K 9/6201* (2013.01); *G06K 9/6289* (2013.01); *G06K 9/78* (2013.01); *G06T 2207/10004* (2013.01); *G06T 2207/10024* (2013.01); *G06T 2207/30196* (2013.01)

(58) Field of Classification Search
None
See application file for complete search history.

(56) References Cited

U.S. PATENT DOCUMENTS 8,312,291 B2 * 11/2012 Golic ................. G06K 9/00288
  382/115
2006/0104484 A1 * 5/2006 Bolle ................. G06K 9/00885
  382/115

(Continued)

OTHER PUBLICATIONS

Australian Office Action in Application No. 2014202219, issued Jun. 17, 2014, 4 pages.
Australian Office Action in Application No. 2014202219, issued Oct. 20, 2014, 2 pages.

(Continued)

*Primary Examiner* — Edward Park
*Assistant Examiner* — Molly Delaney
(74) *Attorney, Agent, or Firm* — Fish & Richardson P.C.

(57) ABSTRACT

A fused image of the person's hand is accessed, the fused image having been generated using a segmented graylevel image and a segmented color image. The hand in the fused image is identified. One or more finger tips and one or more finger valleys in the fused image are identified. One or more fingers of the hand are segmented, based on the identified finger tips and finger valleys. The one or more fingers of the hand are labeled. One or more features for each finger of the hand are determined.

20 Claims, 10 Drawing Sheets

(56) References Cited

U.S. PATENT DOCUMENTS

| | | | | |
|---|---|---|---|---|
| 2010/0021014 A1* | 1/2010 | Bebis | ................ | G06K 9/00375 382/115 |
| 2011/0228094 A1* | 9/2011 | Cheng | ................ | G06K 9/00771 348/159 |
| 2013/0266193 A1* | 10/2013 | Tiwari | ............... | G06K 9/00771 382/115 |
| 2015/0071509 A1* | 3/2015 | Myers | ................. | G06K 9/0002 382/124 |

OTHER PUBLICATIONS

Extended European Search Report in Application No. 14165108.3, dated Oct. 7, 2014, 9 pages.

Al Bovik, "Handbook of Image and Video Processing (First Edition)," in: Handbook of Image and Video Processing, May 2001, pp. 426-428.

Kovac et al., "Human skin colour clustering for face detection," Computer as a Tool: IEEE Region 8 Eurocon 2003, Sep. 22-24, 2003, Faculty of Electrical Engineering, Univ Ljubljana, Slovenia, Proceedings, IEEE Service Center, Sep. 22, 2003, 2:144-148.

Kumar et al., "Personal recognition using hand shape and texture," IEEE Transactions on Image Processing, Aug. 2006, 15(8):2454-2461.

Sanchez-Reillo et al., "Biometric Identification through hand geometry measurements," IEEE Transactions Pattern Analysis Machine Intelligence, IEEE Computer Society, Oct. 2000, 22(10):1168-1171.

Woodard and Flynn, "Finger surface as a biometric identifier," Computer Vision and Image Understanding Academic Press, Dec. 2005, 100(3):357-384.

* cited by examiner

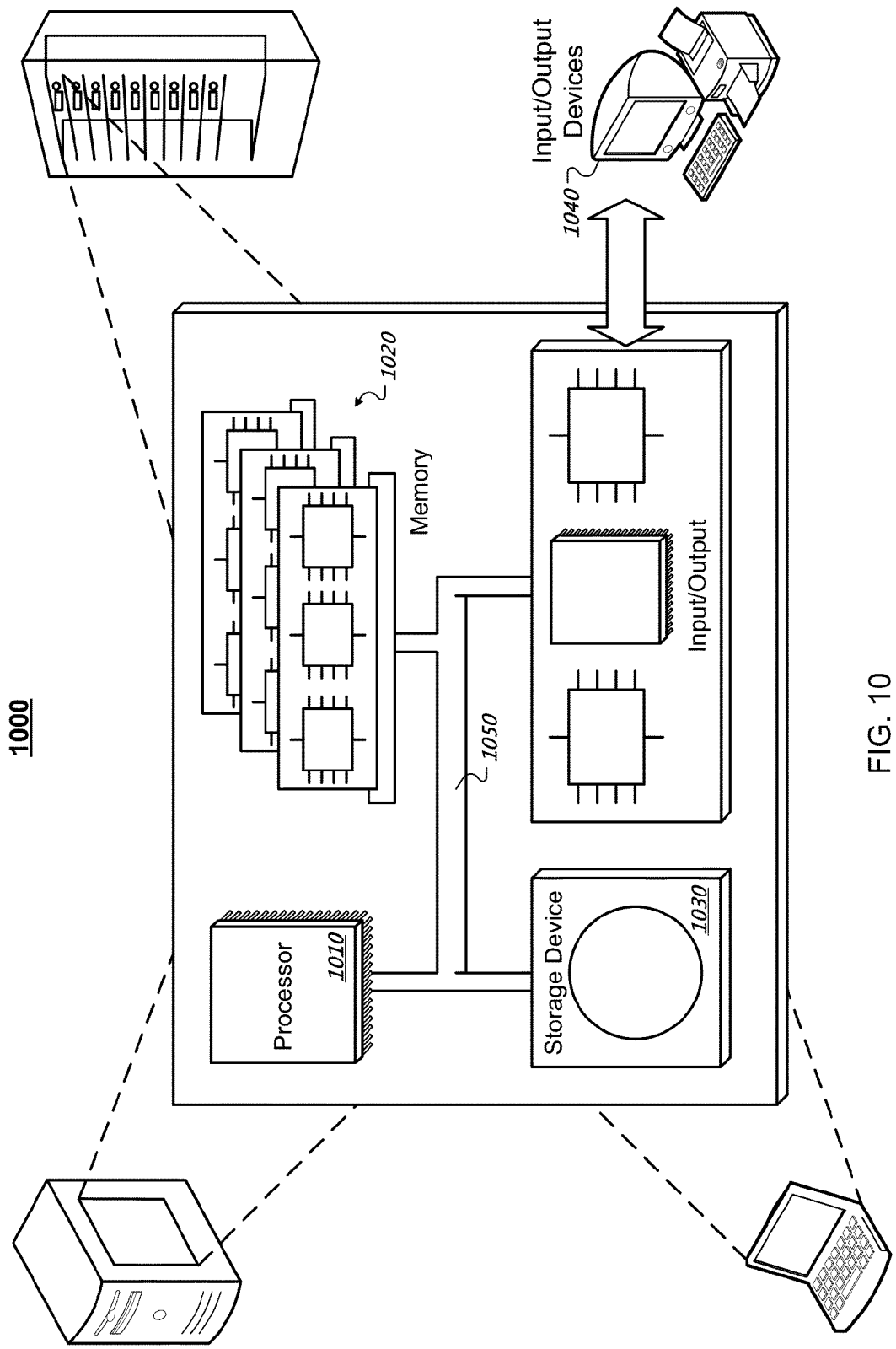

BIOMETRIC RECOGNITION

CROSS-REFERENCE TO RELATED APPLICATIONS

This application is a continuation (and claims the benefit of priority under 35 USC 120) of U.S. application Ser. No. 14/260,986, filed Apr. 24, 2014, now allowed, which claims priority to Indian Patent Application No. 1791/CHE/2013, filed on Apr. 24, 2013, entitled "DESIGN OF A LOW-COST BIOMETRIC RECOGNITION SYSTEM BASED ON HAND GEOMETRY." Both of these prior applications are incorporated by reference herein in their entirety.

FIELD

This disclosure relates to biometric authentication technology.

BACKGROUND

A typical biometric authentication system includes a database of biometric information (e.g., fingerprints, retina scans, facial images, etc.) about individuals. To identify or authenticate a sample of biometric information, the typical biometric matching system compares the sample with entries in the database.

SUMMARY

In one aspect, a system includes at least one processor and at least one memory coupled to the at least one processor having stored thereon instructions which, when executed by the at least one processor, causes the at least one processor to perform operations. The operations include accessing an image of a person's hand, the image having been captured by an image capture device; determining, from a fused image (e.g., a single fused image that is fused by combining information from two or more images) of the person's hand and for each finger of the hand, a respective collection of features, each feature describing a characteristic of the finger, wherein the fused image of the person's hand is generated based on a comparison of first and second segmented images of the person's hand; accessing, from the data storage system, for each finger of a second hand, a respective collection of matching features, each feature describing a characteristic of the finger; generating, based on a comparison of collections of features that correspond to fingers of the first hand and collections of matching features that correspond to fingers of the second hand, a similarity score that measures a similarity between the first hand and the second hand; and outputting a result based on the similarity score.

In another aspect, a method may include one or more of the operations described above. In yet another aspect, a computer-readable storage medium may be operable to cause a processor to perform one or more of the operations described above.

Implementations may include one or more of the following features. For example, the operations may further include accessing a color image of the person's hand; generating, using the color image, a graylevel image of the person's hand; segmenting the graylevel image of the person's hand; segmenting the color image of the person's hand; and generating a fused image using the segmented graylevel image and the segmented color image.

The operations may further include accessing a fused image of the person's hand, the fused image having been generated using a segmented graylevel image and a segmented color image; identifying the hand in the fused image; identifying one or more finger tips and one or more finger valleys in the fused image; segmenting, based on the identified finger tips and finger valleys, one or more fingers of the hand; labeling the one or more fingers of the hand; and determining one or more features for each finger of the hand. The one or more features for each finger include Zernike moments, Hu moments, and finger-width statistics.

The operations further may include determining, for each finger in the first hand, respective distances between features in the collection of features that describe the finger of the first hand and features in the collection of features that describe a corresponding finger of the second hand; determining respective mean (e.g., arithmetic or geometric mean, or moving average) distances for each feature in the collection of features; and generating, based on the respective mean distances, a similarity score that measures a similarity between the first hand and the second hand.

The operations further may include determining, for each finger in the first hand, respective Hamming distances between each feature in the collection of features that describe the finger in the first hand and each matching feature in the collection of features that describes a corresponding finger in the second hand.

The operations further may include determining a mean (e.g., arithmetic or geometric mean, or moving average) distance for the feature using the respective distances between a feature in the collection of features that describe fingers of the first hand and a same (e.g., within 1-10% deviation, preferably within 2-8% deviation, more preferably within 5% deviation) feature in the collection of features that describe corresponding fingers of the second hand.

The operations further may include determining that the similarity score measuring a similarity between the first hand and the second hand satisfies (e.g., exceeds or is below) a (e.g., predetermined) threshold value and, in response to determining that the similarity score measuring a similarity between the first hand and the second hand satisfies (e.g., exceeds or is below) a (e.g., predetermined) threshold value, identifying, using data registered (e.g., preregistered and stored on a database) for a specific person with the data storage system, the identity (e.g., name, ID or passport number, or social security number) of the person.

Implementations may provide one or more of the following advantages. Firstly, using the fused image for measurements of characteristics and features of a person's hand can provide better measurement accuracy than relying solely on a segmented graylevel image or solely on a segmented color image. The system can evaluate the fused image when measuring characteristics and features of the hand. Secondly, segmenting the captured image allows the system to distinguish between pixels that represent the hand and the remaining pixels in the image. Thus, segmenting can allow the system to more accurately identify boundaries of the hand in the captured image. Thirdly, a more accurate, more reliable and faster authentication of a person's hand may be provided thereby enhancing security in situations where a secure access to resources is crucial. The details of one or more implementations are set forth in the accompanying drawings and the description, below. Other potential features of the disclosure will be apparent from the description and drawings, and from the claims.

BRIEF DESCRIPTION OF THE DRAWINGS

FIGS. 2 and 10 are diagrams of exemplary systems.

DETAILED DESCRIPTION

In some implementations, a hand-based biometric recognition approach is used to authenticate a person. Prior to the authentication, data describing the person's hand, e.g., hand geometry, is enrolled in a biometric recognition database. During the enrollment process, images of the person's hand are captured using an image processing device. The images of the hand can be captured from a dorsal or palmar view of the hand.

Next, a biometric system generates, for each finger of the hand, a respective collection of features that each describe a characteristic of the finger. Each feature can describe a geometric structure of a finger or hand. The respective collections of features corresponding to the hand can be stored in the biometric recognition database.

During the authentication process, the person will provide for imaging the same hand, and corresponding view, e.g., palmar or dorsal, of the hand that was used during the enrollment process. An image processing apparatus can capture one or more images of the person's hand.

A biometric system can evaluate the one or more images to generate, for each finger of the hand, a respective collection of features. The biometric system can generate, using a similarity function, a similarity score that measures a similarity between the person's hand and a hand that was previously enrolled in the biometric recognition database. The biometric system can determine, based on the similarity score, a match between the person's hand and a hand that was enrolled in the biometric recognition database and, as a result, determine the identity of the person.

Figure 1:
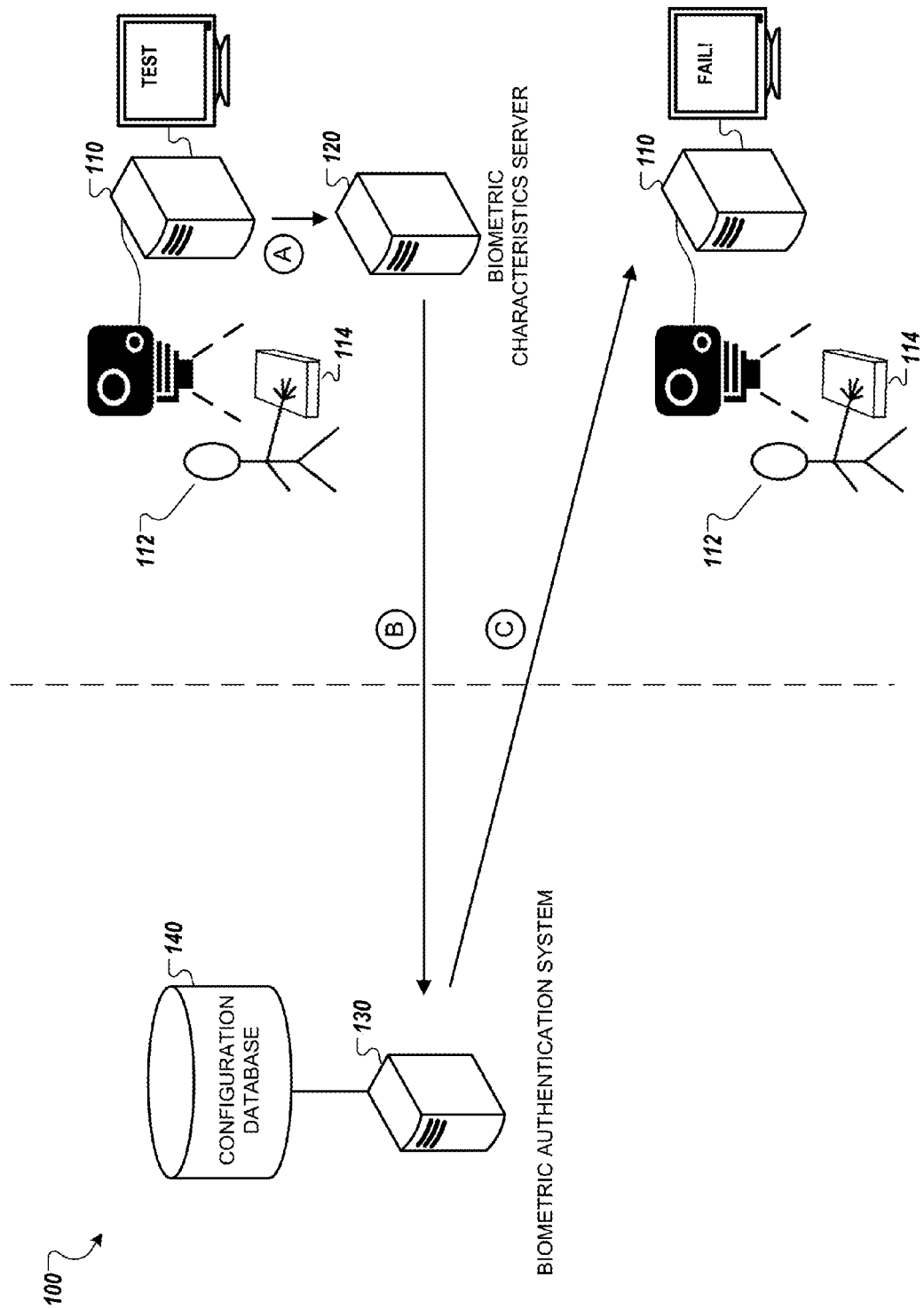
FIG. 1 is a diagram of an exemplary process.

FIG. 1 illustrates an example process 100 for authenticating persons using hand-based biometric recognition technology. As shown, a person 112 is holding their hand 114 in front of an image capture system 110. The image capture system 110 captures an image of the hand 114.

The image capture system 110 communicates data describing the image of the hand 114 to a biometric characteristics server 120. The biometric characteristics server 120 measures characteristics that are present in the image. For example, in some implementations, for an image that includes a person's hand, the biometrics characteristics server 120 can measure the following characteristics: widths of various fingers of the hand, lengths of various fingers of the hand, a width of the palm of the hand, and a thickness of the palm of the hand.

The types of characteristics listed above are provided as examples. In particular, the techniques described in this specification can be applied to any characteristic that can be measured in an image of a hand.

The biometric characteristics server 120 also determines, for each finger of the hand 114, a respective collection of features that each describes a characteristic, e.g., geometric structure, of the finger. In some implementations, the collection of features includes Zernike moments, Hu moments, and finger-width statistics, as described below.

The biometric characteristics server 120 communicates data describing the respective collections of features for fingers of the hand 114 to a biometric authentication system 130. The biometric authentication system 130 is configured to access a configuration database 140. The configuration database 140 can store data describing respective collections of features corresponding to fingers of hands for one or more authorized persons that have been enrolled in the database 140.

The biometric authentication system 130 can use a similarity function to generate respective similarity scores that each measure a similarity between the hand 114 and a hand of an authorized person enrolled in the database 140. Each similarity score can be generated based on a comparison of respective collections of features that correspond to fingers of the hand 114 with respective collections of features that correspond to fingers of the hand of an authorized person.

The biometric authentication system 130 can determine, based on the similarity scores, whether the hand 114 matches a hand of an authorized person that was enrolled in the database 140. The biometric authentication system 130 can communicate this result to the image capture system 110. Based on this result, the image capture system 110 can identify the person 112. In some implementations, the image capture system 110 can combine the result with one or more other results that were determined from one or more different biometric measurements. The combined results can then be used to identify the person 112.

Figure 2:
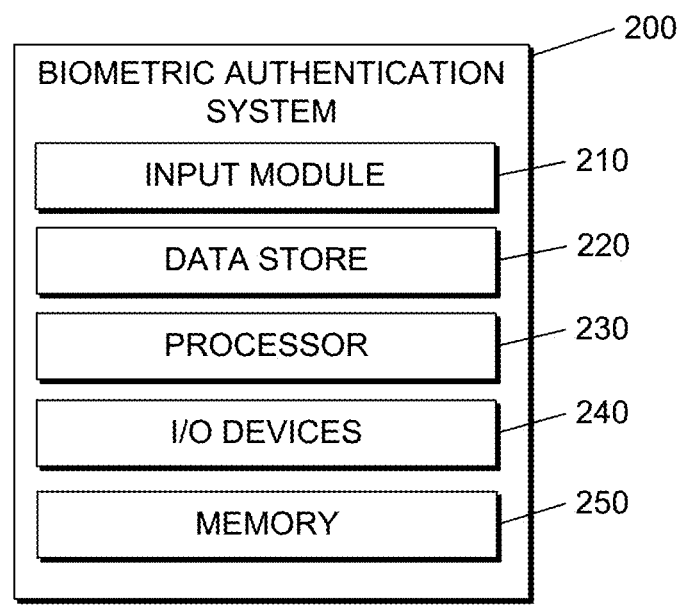

FIG. 2 illustrates an exemplary biometric authentication system 200. The system 200 includes an input module 210, a data store 220, one or more processors 230, one or more I/O (Input/Output) devices 240, and memory 250. The input module 220 may be used to input any type of information used in enrolling and verifying biometric data. For example, the input module 210 may be used to receive new biometric data to enroll in a database or receive sample biometric data to verify against biometric data stored in a database. In some implementations, data from the input module 210 is stored in the data store 220. The data included in the data store 220 may include, for example, any type of biometric data (e.g., hand geometry data, etc.).

In some examples, the data store 220 may be a relational database that logically organizes data into a series of database tables. Each database table in the data store 220 may arrange data in a series of columns (where each column represents an attribute of the data stored in the database) and rows (where each row represents attribute values). In some implementations, the data store 220 may bean object-oriented database that logically or physically organizes data into a series of objects. Each object may be associated with a series of attribute values. In some examples, the data store 220 may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The processor 230 may be a processor suitable for the execution of a computer program such as a general or special purpose microprocessor, and any one or more processors of any kind of digital computer. In some implementations, the system 200 includes more than one processor 230. The processor 230 may receive instructions and data from the memory 250. The memory 250 may store instructions and data corresponding to any or all of the components of the system 200. The memory 250 may include read-only memory, random-access memory, or both.

The I/O devices 240 are configured to provide input to and output from the system 200. For example, the I/O devices 240 may include a mouse, a keyboard, a stylus, or any other device that allows the input of data. The I/O devices 240 may also include a display, a printer, or any other device that outputs data.

Figure 3:
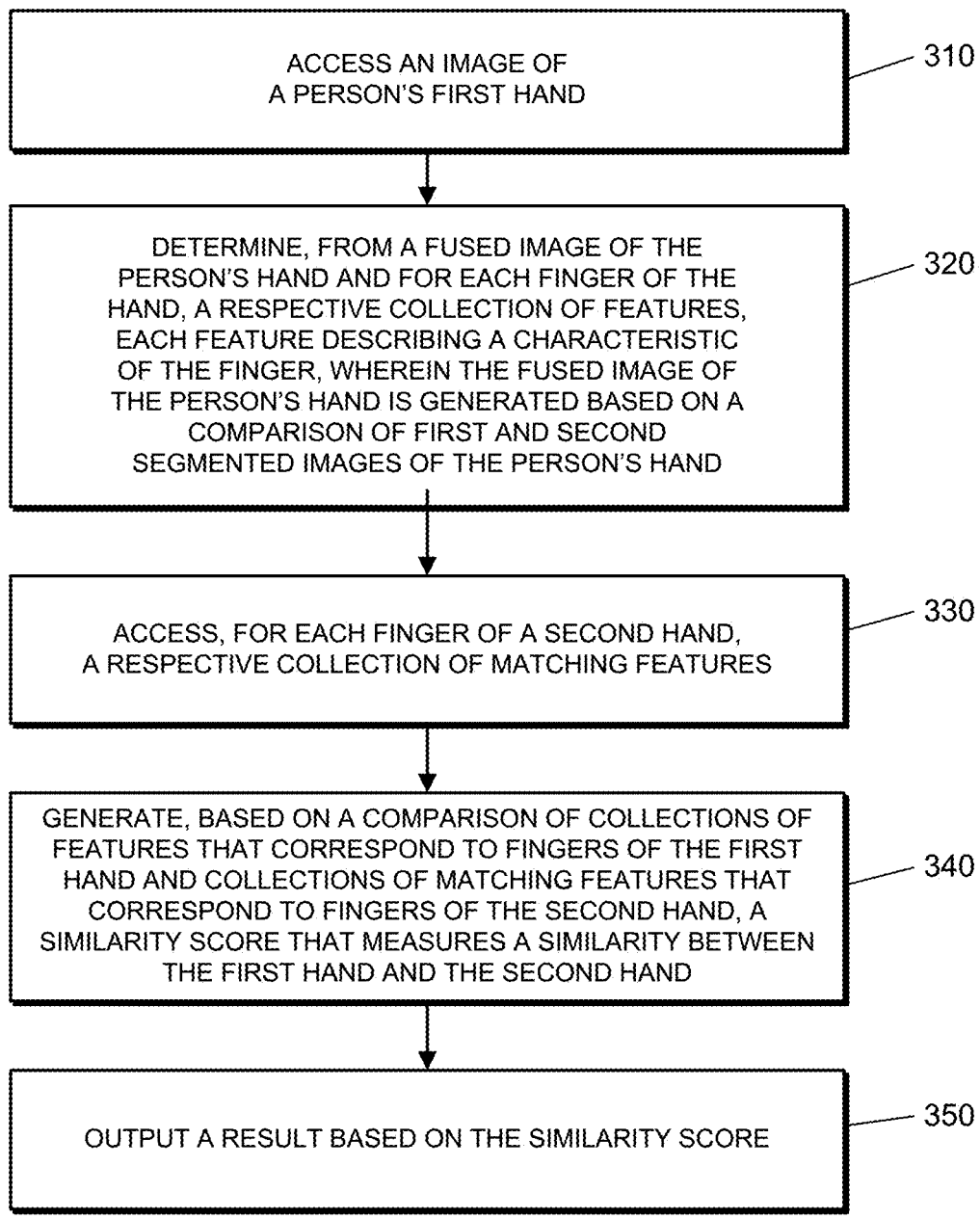
FIGS. 3-5 and 9 are flowcharts of exemplary processes.

FIG. 3 illustrates a process 300 for determining a similarity between a first hand and a second hand. The operations of the process 300 are described generally as being performed by the system 200. In some implementations, operations of the process 300 may be performed by one or more processors included in one or more electronic devices.

The system 200 accesses an image of a person's firsthand (310). For example, the system 200 receives a biometric image of a person's hand, e.g., left hand or right hand. In this example, the system 200 may include or communicate with one or more devices that capture biometric images. The one or more devices may include cameras, fingerprint scanners, hand scanners, or any other type of device capable of capturing a biometric image. The system 200 may access the output of any of the one or more devices as the biometric image, in a traditional image format, such as bmp, jpeg, tiff, png, etc.

When capturing the biometric image of the person's hand, the person can be asked to position the hand against a high contrast background, e.g., against a piece of dark black paper that is positioned below the lens of a device that captures biometric images. The device can capture a two-dimensional color image, e.g., an RGB color image, of the palmar or dorsal surface of the hand. For example, an image of a region extending from the tips of the fingers down to the wrist of the hand. The use of a high contrast background can minimize the effects of shadows and can facilitate the segmentation of the hand from the image. The resolution of the captured image can vary and the hand need not be positioned in a particular way. Typically, however, the person will be asked to position the same hand, e.g., left hand or right hand, that was previously used to enroll the person in the biometric authentication system 200.

In some examples, the system 200 accesses the biometric image from data store 220. In these examples, biometric images may be captured over time at a location separate from the system 200 and stored for later processing and identification. The system 200 also may receive the biometric image over a network.

The system 200 determines, for each finger of the first hand, a respective collection of features (320). Each feature of a finger can describe a characteristic, e.g., geometric structure, of the finger. Depending on the implementation, the features can include Zernike moments, Hu moments, finger-width statistics, or a combination thereof. As described below, features in the collection of features can be determined from measurements of characteristics of the hand. The system 200 can measure characteristics of the hand using, for example, one or more software development kits (SDK) that implement processes for measuring characteristics of a hand.

Example measurements include widths of fingers, lengths of the fingers, width of the palm, thickness of the palm, holistic representation of the hand, compact representation of the hand based on a Principal Component Analysis (PCA) and an Independent Component Analysis (ICA), and measuring a distortion of a pattern that has been projected on the surface of the hand. The types of measurements listed above are provided as examples.

In some cases, the system 200 can determine features that describe characteristics of fingers or a hand using, for example, one or more software development kits (SDK), e.g., the Open Source Computer Vision Library (OpenCV), which is an open source computer vision and machine learning software library.

Figure 4:
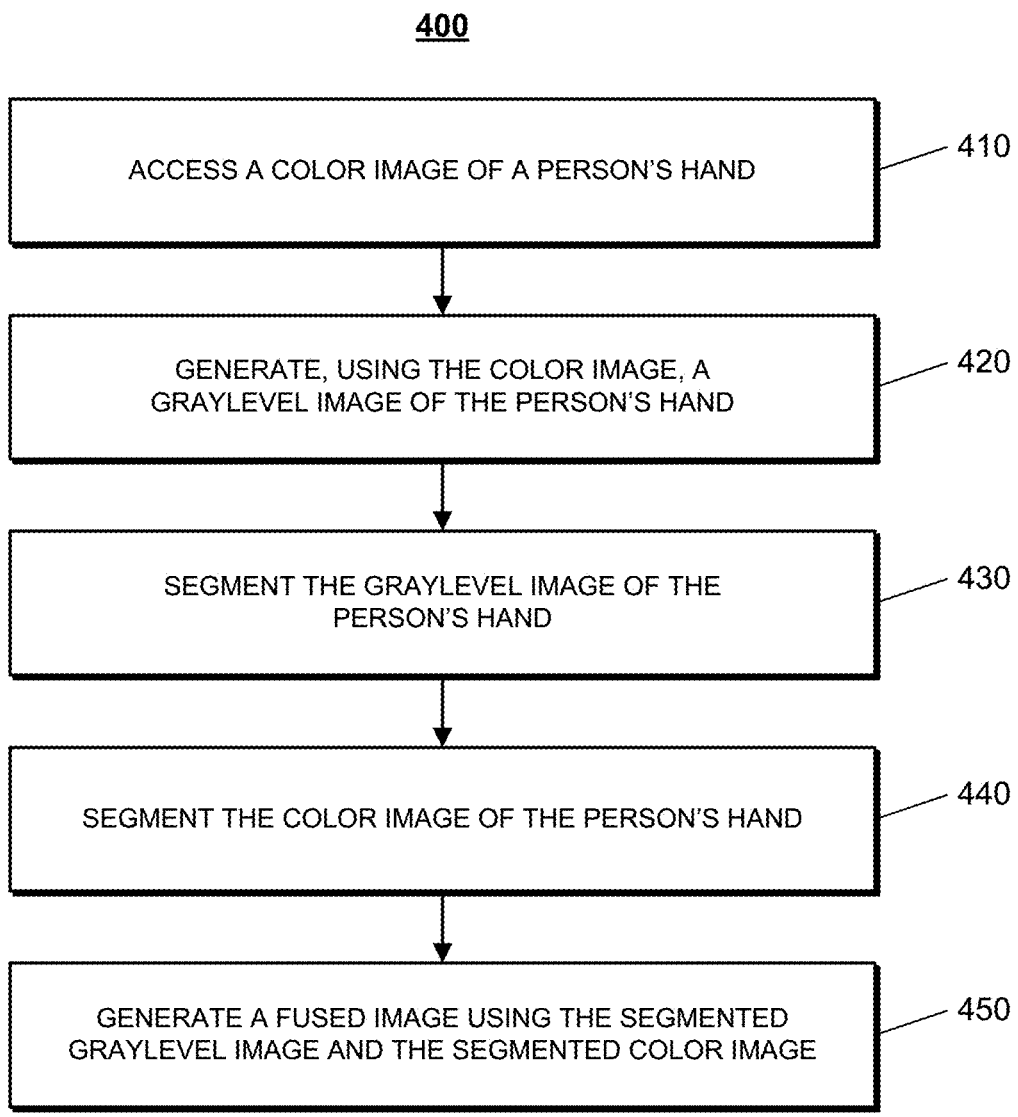

Typically, before measurements and features can be determined, the system 200 segments the captured image of the hand, as described in reference to FIG. 4. Segmenting the captured image allows the system 200 to distinguish between pixels that represent the hand and the remaining pixels in the image. Thus, segmenting can allow the system 200 to more accurately identify the boundary of the hand in the captured image.

Figure 5:
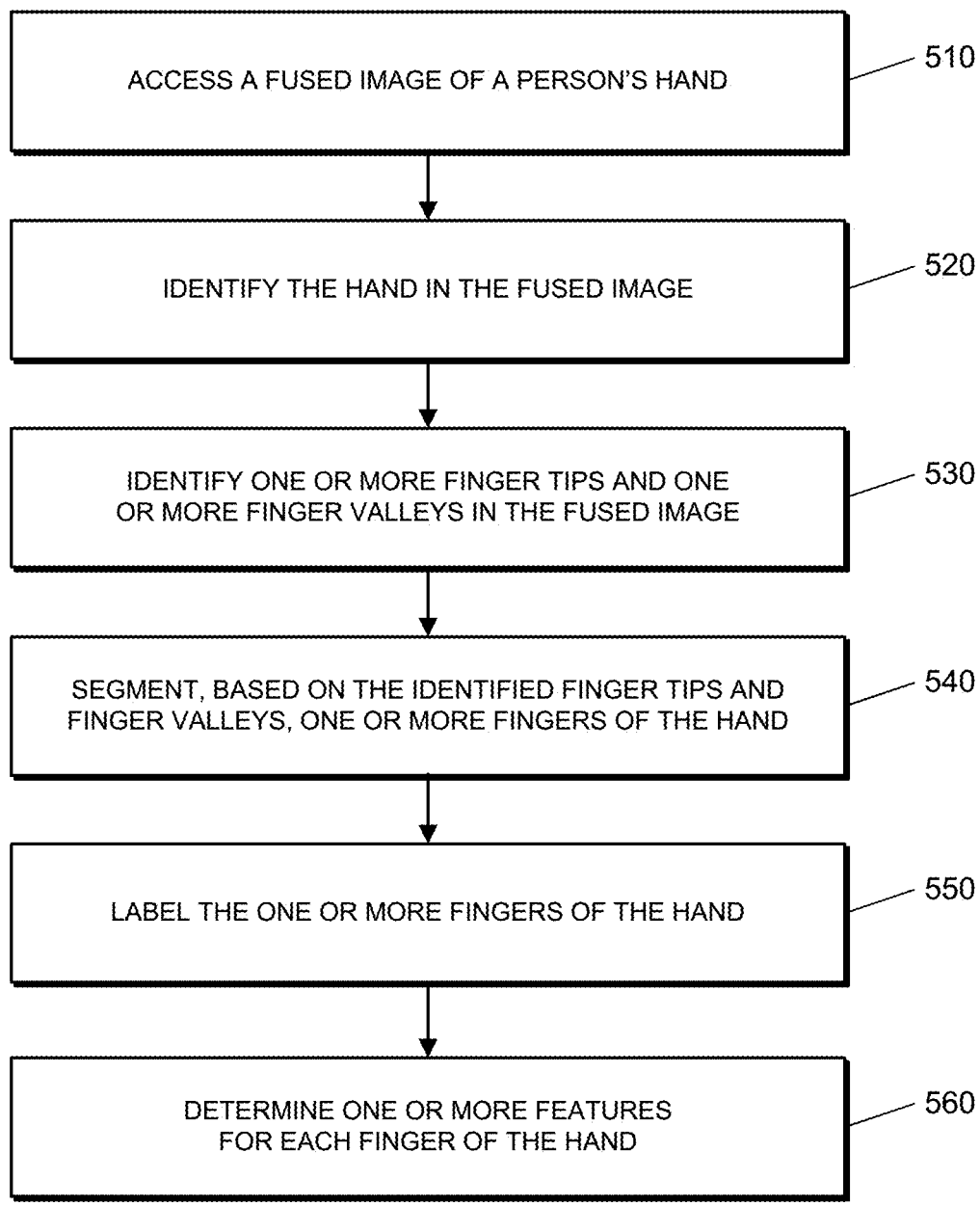

The system 200 generates, from the segmented image, a second segmented image that segments the fingers of the hand, as described in reference to FIG. 5. The system 200 can use the second segmented image to identify the respective boundaries of each of the fingers of the hand in the captured image.

The system 200 can evaluate the second segmented image to determine a respective collection of features for each finger of the hand, as described in reference to FIG. 5.

The system 200 accesses, for each finger of a second hand, a respective collection of features (330). For example, the system 200 accesses the respective collection of features from the data store 220. Generally, the types of features used to determine respective collections of features for fingers of the first hand match the types of features used to determine respective collections of features for fingers of the second hand.

The system 200 generates, using a similarity function, a similarity score that measures the similarity between a first hand and a second hand (340). As described in reference to FIG. 9, the similarity score for the first hand and the second hand can be determined based on a comparison of features for fingers of the first hand and features for corresponding fingers of the second hand. For example, the similarity score can be determined, in part, based on a comparison of Zernike moments and Hu moments corresponding to an index finger of the first hand and Zernike moments and Hu moments corresponding to an index finger of the second hand.

The system 200 outputs a result based on the similarity score (350). For example, based on the similarity score, the system 200 can determine that the first hand matches the second hand and, as a result, authenticate the hand as belonging to a person that was previously enrolled in the system 200.

FIG. 4 illustrates a process 400 for segmenting an image of a hand. The operations of the process 400 are described generally as being performed by the system 200. In some implementations, operations of the process 400 may be performed by one or more processors included in one or more electronic devices.

As described above, segmenting an image allows the system 200 to distinguish between pixels that represent the hand and the remaining pixels in the image. Thus, segmenting can allow the system 200 to more accurately identify the boundary of the hand in the captured image.

The system 200 accesses a color image of a person's hand (410). The system 200 can receive an RGB biometric image of a person's hand, e.g., left hand or right hand, as described above. In some implementations, prior to segmenting, the system 200 pre-processes the color image to prepare the image for segmentation. For example, an image that was captured by a mobile device, e.g., without a flash, may be dark and thus can be brightened to improve the contrast of objects in the image.

To pre-process the image, the system 200 can smooth the color image using a Gaussian filter. The system 200 can apply the Gaussian filter by using a smoothing operation, e.g., using the OpenCV library. Depending on the implementation, the smoothing can be performed using a mask size of 3×3 and sigma of 2.5.

Next, the system 200 brightens the color image by first multiplying each pixel value, in each R, G, and B, channel, by 1.5, to produce a respective multiplied pixel value. For each pixel, the pixel's new value is set by selecting a minimum of 255 or the multiplied pixel value.

The brightened color image is further enhanced by converting the color image into HSV color space and applying a gamma correction to the V channel of the HSV color image.

One example function for applying a gamma correction is reproduced below:

$$\text{output value} = \min\left(255, 255.0 * \left(\frac{\text{input value}}{255.0}\right)^{gamma}\right)$$

where output value is an output pixel value, where input value is an input pixel value, and where gamma is 0.95.

The system 200 generates, using the color image, a graylevel image of the person's hand (420). To generate the graylevel image, the system first converts the color image of the person's hand into a 256-level graylevel image, e.g., an image that describes the person's hand using 256 different intensities of the color gray.

The system 200 segments the graylevel image of the person's hand (430).

In some implementations, the system 200 segments the graylevel image by applying the Otsu threshold-based binarization process. Other implementations that use various pixel-level color-based segmentation methods are also possible, however.

The system 200 segments the color image of the person's hand (440). In some implementations, the system 200 segments the color image using a k-means clustering process. For example, the system 200 can define k as 2 to specify that two clusters should be generated, e.g., one cluster that represents image data corresponding to the foreground of the image and one cluster that represents image data corresponding to the background of the image. To distinguish between the cluster representing the foreground and the cluster representing the background, the system 200 can determine a respective average of each of the three RGB values of each of the cluster centers. The system 200 can categorize the cluster with the higher average RGB value as the foreground cluster and the other cluster as the background cluster. In some implementations, before generating the two clusters, the system 200 initializes the cluster centers using a k-means++ initialization process.

The system 200 generates a fused image using the segmented graylevel image and the segmented color image (450). The system 200 can generate a fused image that combines the segmented graylevel image with the segmented color image. The system 200 can evaluate the fused image when measuring characteristics and features of the hand. Using the fused image for such measurements can provide better measurement accuracy than relying solely on a segmented graylevel image or a segmented color image.

The fused image can be generated by comparing the segmented graylevel image and the segmented color image on a per-pixel basis. If a pixel is classified to be a foreground pixel by either Otsu or k-means, then the corresponding pixel location in the final output fused image is also set to the foreground (or 1 or 255). Otherwise, the system 200 performs additional steps, as described below, to determine whether to promote marginal background pixels as foreground pixels. This is done to avoid holes in the segmented image. The idea is to avoid creating as many holes as possible, so that we do not have too many contours when the contours form the segmented image are extracted.

For each pixel in the segmented color image, the system 200 determines a distance d0 by measuring the distance (e.g., Euclidean distance) of the pixel from the first k-means cluster center, e.g., the foreground cluster. The system 200 also determines a distance d1 by measuring the distance (e.g., Euclidean distance) of the pixel from the second k-means cluster center, e.g., the background cluster.

The system 200 determines a pixel cluster delta value by determining an absolute value of the difference between distance d0 and distance d1. The system 200 also determines an Otsu delta value by determining a distance between a graylevel Otsu threshold value, e.g., a (e.g., predetermined) threshold value determined by the Otsu algorithm, and the pixel's value in the graylevel image.

If i) the Otsu delta value is less than the Otsu threshold value divided by two and ii) the pixel cluster delta value is less than a distance between the first and second k-means cluster centers divided by two, then the system 200 evaluates, in both the segmented graylevel image and the segmented color image, a respective 3×3 pixel grid surrounding the pixel.

If i) one or more pixels in the 3×3 pixel grid for the segmented graylevel image corresponds to the foreground in the segmented graylevel image, ii) one or more pixels in the 3×3 pixel grid for the segmented color image corresponds to the foreground in the segmented color image, and iii) a sum of the Otsu delta value and the pixel cluster delta value is less than a sum of a distance between the first and second k-means cluster centers divided by three plus the Otsu threshold value divided by three, then the system 200 identifies the pixel as a foreground pixel.

In some implementations, the system 200 applies a morphological "open" operation, e.g., using the OpenCV library, to the fused image to eliminate irrelevant image data, e.g., blobs that do not correspond to the hand. For example, the system 200 can perform, for each 3×3 pixel grid morphological element, three times the sequence of morphological open operation followed by a morphological close operation. Next, the system 200 can perform four times a morphological closing operation. The system 20 then finds all contours in the image using a find contours operation, e.g., using the OpenCV library. The opening followed by closing is done to remove noise. Then, only closing is done to repair small holes, if any.

FIG. 5 illustrates a process 500 for segmenting fingers from an image of a hand. The operations of the process 500 are described generally as being performed by the system 200. In some implementations, operations of the process 500 may be performed by one or more processors included in one or more electronic devices.

The system 200 accesses a fused image of a person's hand (510). The system 200 can generate the fused image as described above.

Figure 6D:
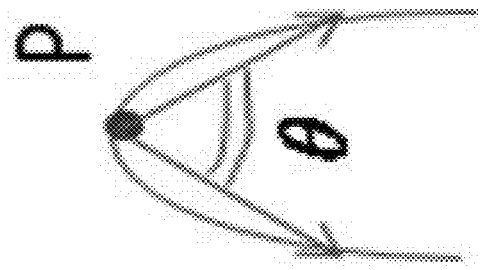
FIGS. 6A-6D illustrate an exemplary detection of the contour of the hand.

The system 200 identifies the hand in the fused image (520). In some implementations, the system 200 identifies the hand by extracting, from the fused image, contours of the hand, as illustrated in FIG. 6A. For example, the system 200 can extract contours using a contour-finding operation in the OpenCV library. The identified contour is labeled as the hand.

Once the hand has been identified, the background pixels of the fused image are set to a "0" value and the foreground pixels are set to a "255" or "1" value. In situations where multiple contours have been extracted, the system 200 can identify the contour having the largest enclosed area as the contour of the hand.

The system 200 identifies one or more finger tips and one or more finger valleys in the fused image (530). The system 200 can use the identified finger tips and finger valleys to identify the fingers of the hand, as described below.

When identifying finger tips and finger valleys, the system 200 determines the center of gravity of the blob that represents the hand. Using the center of gravity of the blob, the system 200 can locate the potential finger valleys by identifying the minima of the distance of points of the contour and the potential finger tips by identifying the maxima of the distance of points of the contour, as illustrated in FIG. 6B.

As described below, the minima and maxima of the distance of points of the contour are combined with convex defects in the contour and vertex angles of high curvature locations in the contour to identify the actual finger tips and the finger valleys in the fused image.

For example, the system 200 can determine a minima and maxima by determining the distance of each point, p, on the contour from the center of gravity and the respective coordinates for the point p. The system 200 can smooth each distance value using weights. For instance, the system 200 may replace each distance by the weighted average of the distances of the current pixel and of two neighboring on each side of the current pixel using weights having values of three for the current pixel, two for the neighboring pixels adjacent the current pixel, and one for the neighboring pixels that are spaced from the current pixel by one other pixel. For each point on the contour of the hand, e.g., curPoint, the system determines the point previous to the point, e.g., prevPoint, and the point next to the point, e.g., nextPoint, where the previous point prevPoint and the next point nextPoint are N, e.g., 3, steps away on each side of the point curPoint. The system 200 determines the normalized dot product, e.g., unit magnitude, normDotProd, between the vector joining the point curPoint and the previous point prevPoint and for the point curPoint and the next point nextPoint. The system defines an angle-based quality measure, e.g., outValue. One example function for determining the outValue is reproduced below:

$$outValue = (int)\left(\frac{255.0}{(normDotProd * normDotProd) + 1.0}\right)$$

If the outValue is greater than 255, the system 200 sets the outValue to 255. The system saves the outValue in a quality map, e.g., image, using the coordinates of the point curPoint. The system determines the local maxima of the distance from the center of gravity using the smoothed distance values.

For each maximum found, the system determines a distance quality value, e.g., distQuality. First, the system 200 sets a value curDist as the distance of current maximum point on the contour from the center of gravity. The system 200 sets a value nextDist as the distance of the next point that is one step ahead on the contour from the center of gravity. The system 200 sets a value prevDist as the distance of the previous point that is one step behind from the current point on the contour from the center of gravity. The maximum implies curDist is greater than both the nextDist and prevDist. The system 200 determines a value deltaDistSumby using an example function reproduced below:

deltaDistSum=(curDist−prevDist)+(curDist−nextDist)

The system 200 determines a value curDistQuality using an example function reproduced below:

$$curDistQuality = minimum\left(255, \left(255.0 * \left(\frac{(float)deltaDistSum}{(float)curDist}\right)\right)\right)$$

The system then saves distQuality for the current maximum. The system 200 also determines local minima of the distance from the center of gravity using the smoothed distance values. The system 200 repeats the steps for determining curDistanceQuality for each minimum found. Further, the system 200 visits each local maximum and deletes all other local maxima within a specified radius, e.g., 10. The system 200 also visits each local minimum and deletes all other local minima within a specified radius, e.g., 10.

Next, the system 200 fits a convex hull to the points of the contour of the hand. For example, the convex hull can be fit using a convex hull operation in the OpenCV library.

Figure 6C:
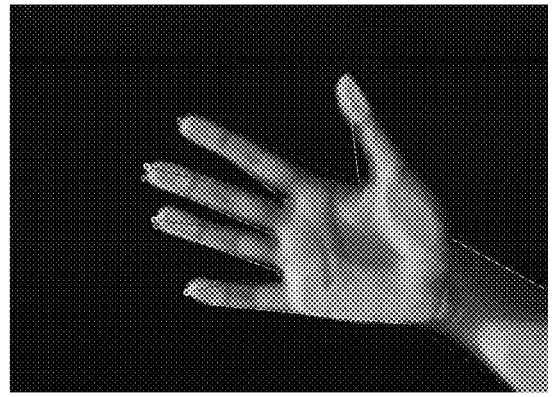
Figure 6B:
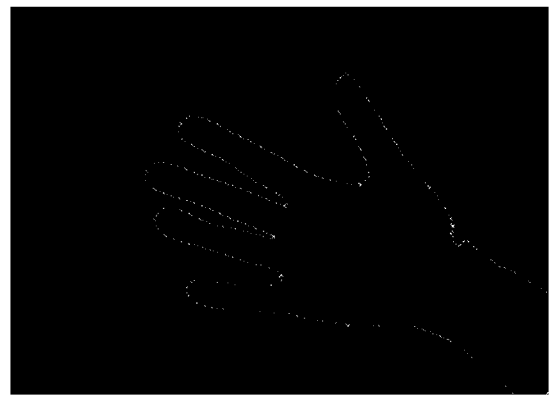
Figure 6A:
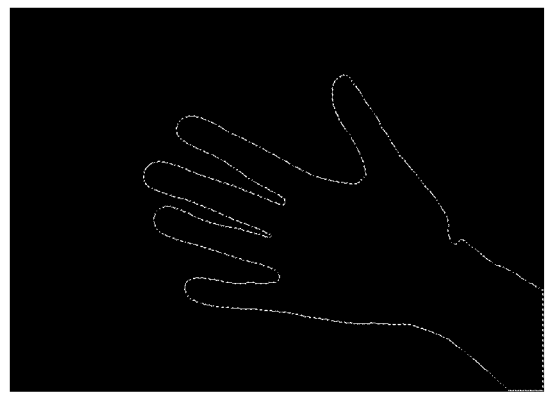

The convex hull operation can also be used to identify convex defects, e.g., the locations of points of the contour that are not convex, as illustrated in FIG. 6C. The convex hull operation identifies each convex defect, together with respective depth points, e.g., points of the contour located at the farthest distance from the convex hull boundary, and respective end points, e.g., neighboring vertices of the convex hull that bracket the convex defect.

The system 200 identifies end points that are located in close proximity, e.g., within a (e.g., predetermined) threshold distance, to the maxima of the distance of points of the contour as potential finger tip points. Further, the system 200 identifies depth points that are located in close proximity, e.g., with a (e.g., predetermined) threshold distance, to the minima of the distance of points of the contour as potential finger valley points.

In some implementations, the system 200 then uses the maximum of the depth values from the validated finger tips and finger valleys to estimate the length of the middle finger of the hand. The length of the middle finger can be used to scale the fused image.

The system 200 calculates respective vertex angles, e.g., angle theta, for each point on the contour, as illustrated in FIG. 6D. Since finger tips and finger valleys generally correspond to locations of the contour having a high curvature, each vertex angle is subtended, at each point on the contour, by the segments joining the point with neighboring points located at equal distances (e.g., within 5% or 10% deviation) on both sides of the point. For example, the angle theta may span an angular range that is defined by the tip (P) of the finger (e.g., within 0.1 mm or 1 mm from the actual tip of the finger) and two points along the contour of the finger, wherein the two points have about equal (e.g., within 5% or 10% deviation) distance from the tip of the finger.

The system 200 fuses the minima and maxima of the distance of points of the contour with convex defects in the contour, and the vertex angles of high curvature locations in the contour to identify the actual finger tips and the finger valleys in the fused image, to identify actual finger tips and finger valleys, as described above.

The system 200 can also address any convexity defects by finding the convex defects in the contour of the hand. Each convex defect has a depth point, e.g., the valley, a starting point, and an end point. The system 200 performs various operations for each convexity defect. For example, the system 200 steps through each convexity defect to determine whether the convexity defect should be saved for further processing. In this example, the system 200 checks whether the depth point of each convexity defect lies within a radius of 20 from a distance minimum point. If the depth point of the convexity defect does not lie within a radius of 20 from a distance minimum point, the system 200 determines not to save the convexity defect for further processing. Otherwise, the system 200 continues to process the convexity defect and determines the angle between the vector joining the current depth point to the current end point and the vector joining the current depth point to the current start point. If the magnitude of the determined angle is less than a (e.g., predetermined) threshold, e.g., 10-80 degrees, preferably 20-70 degrees, more preferably 50 degrees, and i) if the current start point lies within a distance of a convex hull defect radius of 20 from a distance maximum and ii) the current end point is within a distance of a convex hull defect radius of 20 from a distance maximum, then the system 200 saves the convexity defect information provided that the number or count of the convexity defect points is less than a (e.g., predetermined) set threshold, e.g., 1-15, preferably 5-10, more preferably 8. For each saved convexity defect point, the system 200 determines the distance between the defect point and the corresponding start point, e.g., distDepth_MeanStartEnd. The system 200 then finds the maximum over the distDepth_MeanStartEnd values for the saved convexity defect points and saves the maximum as the maximum estimated fingerprint length of the longest finger, which the system 200 identifies as the middle finger.

Using the actual finger tips and finger valleys, the system 200 re-estimates the length of the middle finger of the hand. As described below, the length of the middle finger can be used to segment the fingers of the hand.

The system 200 segments, based on the identified finger tips and finger valleys, one or more fingers of the hand (540). The system 200 performs one or more binary morphological operations on the fused image to segment the fingers of the hand.

The system 200 generates an image Hp by applying a first open operation to the fused image H using the OpenCV library. In some implementations, the system 200 applies a circular morphological disc element of diameter D. The value of D can be determined empirically by evaluating lengths of middle fingers. One example diameter value is determined by multiplying the value 0.2 by the estimated length of the middle finger.

Figure 7A:
FIGS. 7A-7D illustrate an exemplary finger segmentation process.
Figure 7B:
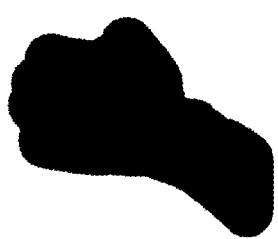

The system 200 generates an image Hf containing the segmented fingers of the hand by applying a logical AND operation to pixels in the fused image H with corresponding pixels in a complement image ~Hp of the image Hp. FIG. 7A illustrates the fused image H and FIG. 7B illustrates a complement image ~Hp of the fused image H.

The system 200 applies a second open operation using the OpenCV library to the image of the segmented fingers Hf. This time, the system 200 applies a circular morphological disc element using smaller diameters D1 and D2 to remove any remaining slivers in the image.

In particular, the image Hf is subjected to two iterations with a morphological open operation with disc of diameter, D1, equal to an odd number nearest to value determined by dividing a value D0 by 12, e.g., an odd number value of 5. One example function for determining D0 is reproduced below:

$$D0 = 2*(\text{maximum fingerprint length}*0.2)+1$$

The image Hf is then subjected to a morphological close operation with a disc of diameter, D2, equal to an odd number nearest to a value determined by subtracting the value D1 by 2, e.g., an odd number value of 3.

Figure 7C:
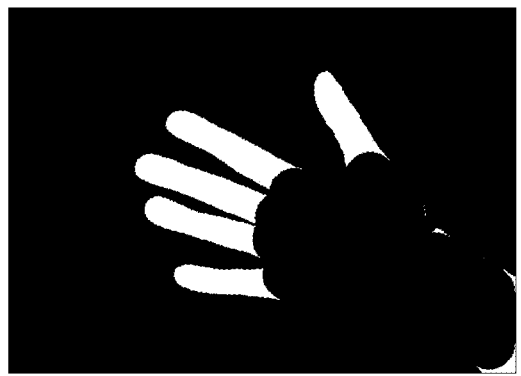
Figure 7D:
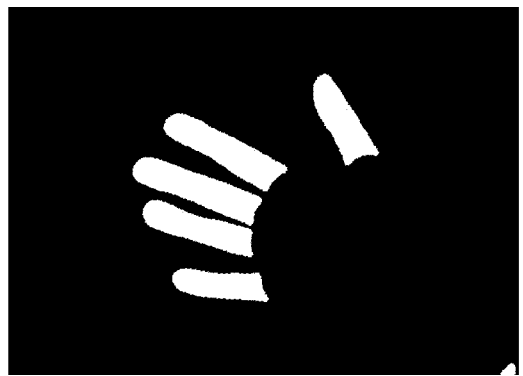

FIG. 7C illustrates an image of the hand having slivers and FIG. 7D illustrates an image of the hand after the slivers have been removed.

At this point, the image of the segmented fingers Hf may still include blobs that do not correspond to any of the fingers of the hand. The system 200 can perform additional operations to identify and remove the non-finger blobs, as described below.

In some implementations, the system 200 sets a threshold for the minimum finger area using the estimated length of the middle finger.

Figure 8A:
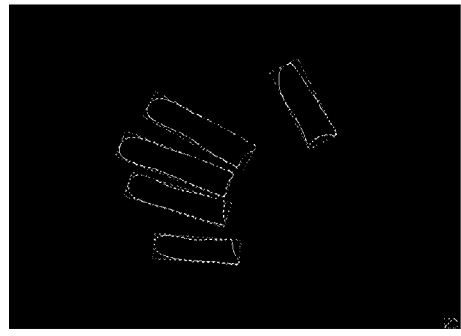
FIGS. 8A-8D illustrate an exemplary finger labeling process.
Figure 8B:
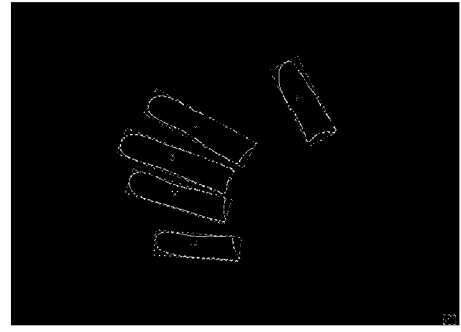
Figure 8C:
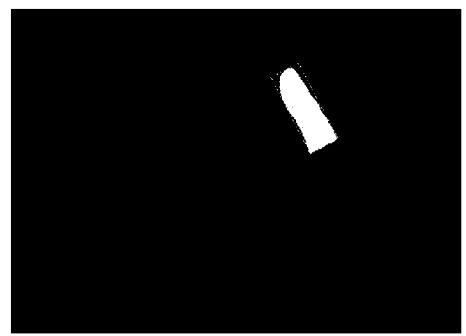
Figure 8D:
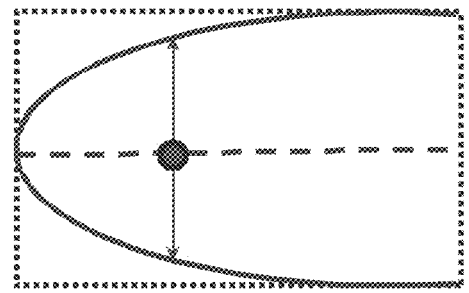

The system 200 can apply an operation using the OpenCV library to fit respective smallest enclosing rectangular boxes to each of the blobs in the image Hf. The width of each box for a blob generally corresponds to the maximum width of the finger, as illustrated in FIG. 8D. FIG. 8A illustrates a respective smallest enclosing rectangular box for each of the blobs.

In some implementations, the system 200 selects blobs that have a respective box area that exceeds the minimum finger area for further processing. For each selected blob, the system 200 calculates the median width of the respective boxes corresponding to the selected blobs, as described below. The system 200 identifies blobs that have a width within a (e.g., predetermined) threshold of the median width for further processing.

The system 200 calculates a box area, e.g., height multiplied by width, for each of the blobs. If a blob's box area is less than a box area threshold, then the blob is no longer considered.

One example function for determining a blob's box area is reproduced below:

$$\text{box area threshold} = (\text{maxFingerLength}*\text{maxFingerHeight}*c)$$

where maxFingerLength is an estimated maximum finger length, where maxFingerHeight is an estimated maximum finger height, and where c is a constant, e.g., 0.0625.

However, if a blob's box area is greater than or equal to the box area threshold, then the system 200 calculates a width and height ratio for each of the blobs identified for further processing. The width and height ratio can be determined by dividing a box's width by the height plus an offset, e.g., 0.1. Blobs that have a ratio within a threshold interval, e.g., between a low threshold of 0.15 and a high threshold of 0.6, are identified as blobs that correspond to the fingers of the hand.

The system 200 further processes the blobs still under consideration by determining whether the blobs satisfy a threshold width. To this end, the system 200 determines the median width for the blobs still under consideration. The system 200 then determines whether a respective width of the blobs is within a threshold width.

One example function for determining whether a blob is within a threshold width is reproduced below:

$$abs(widthEst-boxWidth)<thresholdWidth$$

where widthEst is the median width, boxWidth is a width of a box, and thresholdWidth is the threshold width.

The threshold width can be determined by multiplying the median width by an offset, e.g., 0.35.

The system 200 selects the five largest blobs that were identified as blobs that correspond to the fingers of the hand as the segmented finger blobs. Depending on the implementation, the system 200 can be adapted to select and process fewer than five blobs. That is, the system 200 need not require that all five fingers of a hand be present for performing the operations described in this specification.

The system 200 labels the one or more fingers of the hand (550). In some implementations, the system 200 identifies the two blobs corresponding to fingers of the hand that have the smallest length or height. Since the thumb is generally thicker, or wider, than the little finger, the system 200 labels the blob having the larger width among the two identified blobs as the thumb of the hand. The remaining blob is labeled as the little finger.

In some implementations, to label the remaining fingers, the system 200 uses distances between the respective rectangular-box centroids that enclose the finger blobs. The rectangular box whose centroid is nearest to that of the rectangular box of the little finger is labeled as the ring finger. Further, the rectangular box whose centroid is nearest to the centroid of the rectangular box corresponding to the thumb is labeled as the index finger. The remaining rectangular box is labeled as the middle finger.

In some implementations, if the box-center of the index finger is found nearer to those of the middle finger and thumb, than to those of the ring and little fingers, then the method proceeds further. Otherwise, an error is declared, and the processing is terminated as a failure, e.g., no template is generated in this case and the enrollment of the given input hand fails.

By labeling the fingers, the system 200 can more easily compare features of a finger, e.g., index finger, of a first hand with features of the same finger, e.g., index finger, of a second hand. FIG. 8B illustrates fingers of the hand that have been labeled.

The system 200 determines one or more features for each finger of the hand (560). The system 200 can determine the features by evaluating the filled blob contours.

In some implementations, the system 200 determines, for each finger, Zernike moments, Hu moments, and finger-width statistics. In some implementations, the system 200 determines Hu moments and finger-width statistics before filling any cavities that resulted from the segmentation of the fingers. Zernike moments, however, are determined after filling in any cavities that resulted from the segmentation of the fingers, as illustrated in FIG. 8C. Each cavity corresponds to a region enclosed by a bottom of the contour of the finger and a finger valley end boundary of a respective rectangular box of the finger. The cavities are generated due to the action of the circular shape of the morphological elements employed for finger segmentation.

In situations where the blobs are represented using respective contours of fingers, as illustrated in FIG. 8A, the system 200 can use a fill operation in the OpenCV library to fill a cavity. The fill operation requires a seed point that belongs to the cavity-region. The "fill" operation gradually fills up the cavity by filling in the neighborhood of the seed point, and then by expanding that neighborhood. The seed point is generated by traversing from the valley-end (finger-bottom) to the tip-end of the box along the center-line of the box. The generated seed point is the first point along the center-line that belongs to the cavity. The center-line is the line that joins the center of the valley-side of the box to that of the tip-side of the box.

The system 200 can determine Zernike moments using generally known techniques. In some implementations, before determining Zernike moments, the system 200 normalizes an image of each finger to be a length of 150 pixels. The system 200 morphologically dilates using a circular element of 3×3 pixels. The system 200 can be configured to determine varying magnitudes of Zernike moments, e.g., an order of 10. The magnitudes of the Zernike moments for each finger are saved in a database, e.g., the database 140, for use in authenticating the hand.

By using the magnitudes of the Zernike moments, the system 200 provides rotation-invariance. To ensure scale- and translation-invariance, the system 200 normalizes each finger image so that the finger-length is 150 pixels prior to starting the Zernike moment calculation. Similarly, the system 200 performs the Zernike moment calculations with respect to the centroid of the finger contour.

The system 200 can determine respective Hu moments for each finger using a Hu moment operation in the OpenCV library. For example for each finger blog, the system 200 determines the seven-element vector of the Hu moments which are scale, rotation, and translation invariant. The system 200 then saves the seven-element Hu moment vector for the finger in a template. Each element of the vector is a floating-point real number.

In some implementations, the system 200 determines finger-width statistics for each finger by evaluating a respective contour of the finger and a rectangular box that encompasses the finger. As illustrated in FIG. 8D, the system 200 determines a finger-width statistic by considering a center line that connects the center of a tip-end side of the rectangular box to the center of the valley-end side of the box. In FIG. 8D, the center line is depicted using a dotted line.

When determining finger-width statistics, the system 200 assigns, for each finger blob and its associated box, vertices p1, p2, p3, and p4, such that vertices p1 and p2 represent a short side of the box along the width dimension and vertices p3 and p4 represent the other short side of the box.

The system compares the coordinates of the distance maxima, which represents the finger tips, with the middle point of the line formed by (p1, p2) and the line formed by (p3, p4) to determine which pair is closer to the finger tips. The pair that is closer to the finger tip represents the tip-end of the box and the other pair represents the valley-end of the box. The system 200 aligns the line formed by (p1, p3) and the line formed by (p2, p4) with the long sides, or edges, of the finger. The identification of both the tip-end and the valley-end may useful in ensuring the finger is always traversed along its length in a specific direction (e.g., from the tip to the valley).

Assuming ct is the tip midpoint for the line formed by (p1, p2), and cv is the valley midpoint for the line formed by (p3, p4), the system 200 uses the line formed by ct and cv, e.g., the longitudinal line joining ct and cv with ct and cv being the two end pints of the line, to approximate the centerline of the finger running from the finger tip to the valley of the finger.

The system 200 traverses the longitudinal line, beginning from ct and ending at cv, and estimates the width of the finger at each point on the line. To estimate the width, for any point, e.g., c0, along this traversal of the longitudinal line, the system determines a cross-section of the finger. To determine the cross-section, the system 200 first traverses in a direction perpendicular to the longitudinal line, beginning from the point c0 toward one side of the finger contour and ending once the contour of the finger is reached. The system 200 then traverses from the point c0 along the same perpendicular line but this time in an opposite direction, e.g., toward the other side of the contour of the finger and ending once the contour of the finger is reached. The distance between the two stops represents the width of the finger at the location corresponding to the point c0. This process is repeated for all points along the longitudinal line as the system 200 traverses from ct to cv.

Once this process is complete, the system 200 has determined a vector of finger thickness samples. The length of a vector, e.g., the number elements in the vector, represents the length of a respective finger box.

The system 200 applies a smoothing to the vector of finger thickness samples by replacing each element in the vector with an average of seven values in its neighborhood. For example, if the current element is represented by index i, then the system takes the average of the elements corresponding to the indices: (i−3), (i−2), (i−1), (i+1), (i+2), (i+3). The vector of the smoothed values is used for the remaining calculations.

The system 200 then attempts to summarize the smoothed vector by sampling, e.g., sub-sampling, at suitable locations. The sampled summary data is then used for the actual comparison of vectors of finger thickness samples.

The system 200 samples the vectors of finger thickness samples by taking samples beginning from the extreme fingertip point and continuing to a position a position near the valley along the finger length. The system 200 determines, using the samples, a truncated mean and variance that represent the tip part of the finger. The mean and variance can be used as summary sample stats that are included in a template for future feature comparison.

The remaining samples are taken at central points that are located a distance "d" apart. At each such central point, the system 200 takes a certain number of local samples above and below the central point. The number of the local samples taken may be some function f(d) of the spacing d. The system 200 calculates the truncated mean and variance of the local samples and reported as the summary of the width statistics at the given central point. The system 200 repeats this process for each central point. Note that the number of central points is variable, depending on the finger length. The system 200 reports one pair (e.g., mean, variance) for the tip, and a variable number of (e.g., mean, variance) pairs for the rest of the finger. In some examples, the central points are arranged such that the samples near the valley region are not employed due to the uncertainty associated with the likely presence of the cavity in the valley region.

In one implementation, the system 200 takes samples centered at each value of i, beginning at i=incr+IHD (2*incr+IHD), (3*incr+IHD), . . . where IHD=linHalfDim (i.e., the half dimension of the line corresponding to each central point). The actual number of values that i will take depends on the value of the original number of samples.

In this implementation, at each of the central values of i, the system 200 samples from i-IHD through i+IHD, which leads to (2*IHD+1) samples centered at the particular value of i. Specifically, for the first value of i from above, namely 25, the samples will correspond to (25−5) to (25+5) (inclusive): i.e., at 20, 21, . . . , 29, 30 taken from the smoothed vector. These samples will be 11 in count. The system 200 computes a truncated mean and variance of these 11 values, and reports those as the summary stats for this value of i. The summary stats are saved and the process is repeated for the remaining values of i such that summary stats are determined for each central point.

Note that, in this implementation, while the vector's total length may be 167, the system 200 takes the last sample at only i=145. The reason for stopping short is to avoid visiting the valley region (where the presence of the cavity may make the calculations uncertain).

The system 200 determines sample sets for index i for a range over an index range beginning with (i−linHalfDim) to (i+linHalfDim) for each value i, where linHalfDim is determined by for example, dividing the number of elements in the vector by a threshold of thickness samples, e.g., 7, by a constant, e.g., 4. One function for determining the value for index i is reproduced below:

$$i=(incr+linHalfDim), ((2*incr)+linHalfDim), \ldots, ((8*incr)+linHalfDim)$$

where incr is the number of elements in the vector divided by a threshold of thickness samples, e.g., 7 and where linHalfDim is incr divided by a constant, e.g., 4.

The system 200 can store, for each finger, the respective Zernike moments, Hu moments, and finger-width statistics, as a collection of features that describe a characteristic or geometry of the finger.

The system 200 can generate a similarity score that measures a similarity between a first hand and a second hand by comparing a respective collection of features for each finger of the first hand with a respective collection of features for each corresponding finger of a second hand, as described below in reference to FIG. 9.

Figure 9:
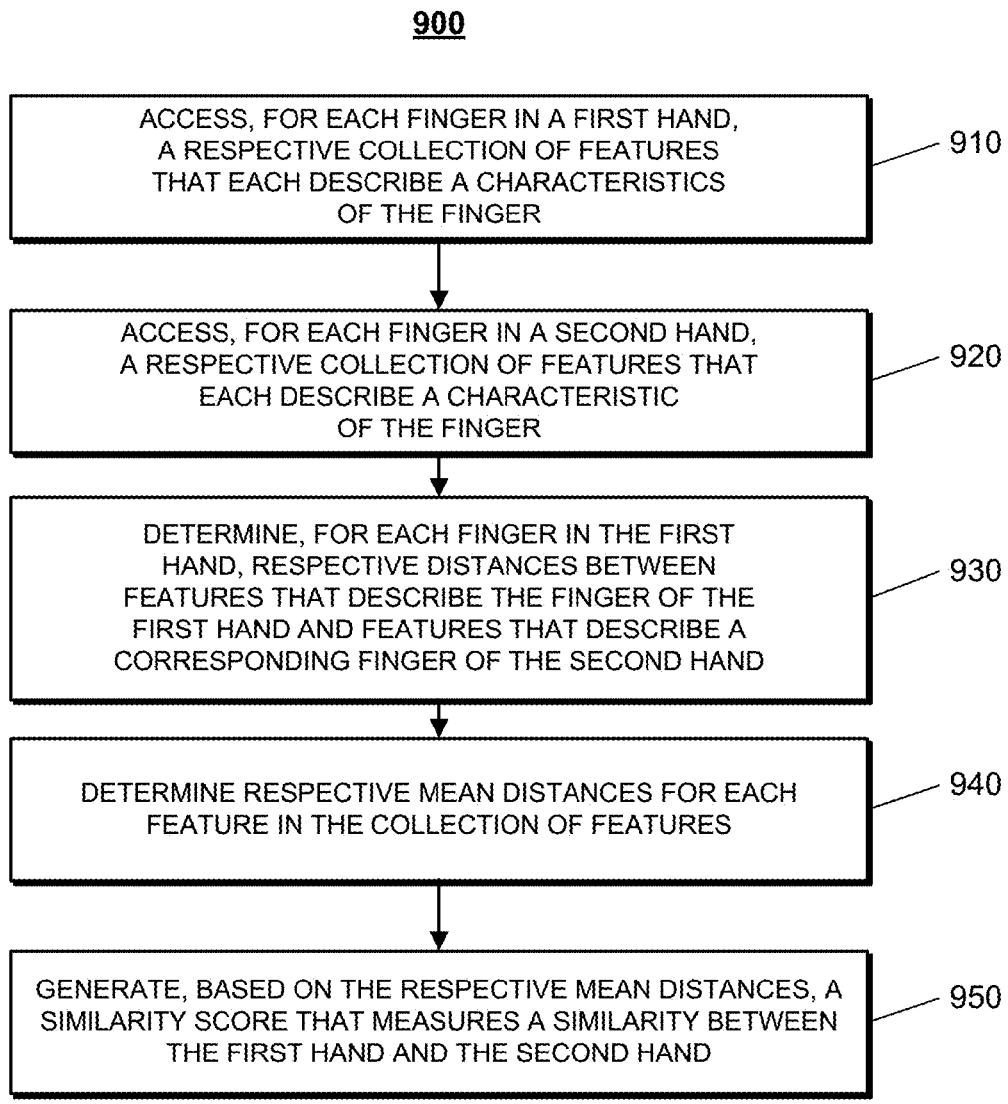

FIG. 9 illustrates a process 900 for generating a similarity score that measures a similarity between a first hand and a second hand. The operations of the process 900 are described generally as being performed by the system 200. In some implementations, operations of the process 900 may be performed by one or more processors included in one or more electronic devices.

The system 200 accesses, for each finger in a first hand, a respective collection of features that each describe a characteristic of the finger (910). For example, the system 200 can obtain a collection of features, e.g., Zernike moments, Hu moments, and finger-width statistics, for a finger from a biometric database, e.g., the database 140. A collection of features for a finger describes characteristics of the finger. Each finger in the first hand can have its own collection of features.

The system 200 accesses, for each finger in a second hand, a respective collection of features that each describe a characteristic of the finger (920). For example, the system 200 can obtain a collection of features, e.g., Zernike moments, Hu moments, and finger-width statistics, for a finger from a biometric database, e.g., the database 140. A collection of features for a finger describes characteristics of the finger. Each finger in the second hand can have its own collection of features.

When accessing collections of features for fingers of the second hand, the system 200 can select collections of features that correspond to a hand that matches the orientation, e.g., left hand or right hand, of the first hand. For example, if the first hand is a left hand, then the system 200 can access collections of features that also correspond to a left hand.

Further, in some implementations, the types of features included in collections of features for fingers of the first hand match the types of features for fingers of the second hand.

That is, the system 200 can be configured to match the types of features between collections of features for fingers in the first hand and collections of features for fingers in the second hand. For example, if the collections of features for fingers in the first hand include Zernike moments and finger-width statistics, then the system can access collections of features for fingers in the second hand that also include Zernike moments and finger-width statistics.

The system 200 determines, for each finger in the first hand, respective distances between features that describe the finger of the first hand and features that describe a corresponding finger of the second hand (930). As described above, a collection of features describing a finger can include Zernike moments, Hu moments, and finger-width statistics.

For example, for the index finger of the first hand, the system 200 can determine a distance between Zernike moments that describe the index finger of the first hand and Zernike moments that describe the index finger of the second hand. Similarity, the system 200 can determine a distance between Hu moments that describe the index finger of the first hand and Hu moments that describe the index finger of the second hand. Further, the system 200 can determine a distance between finger-width statistics that describe the index finger of the first hand and finger-width statistics that describe the index finger of the second hand.

This process can be repeated for each feature describing each of the remaining fingers, e.g., middle finger, ring finger, thumb, and little finger.

In some implementations, the system 200 determines a distance between Zernike moments by calculating a Hamming distance between Zernike moments that describe a finger of the first hand and Zernike moments that describe a finger of the second hand. The Hamming distance between two pixel strings of equal length may be the number of positions at which the corresponding pixel contents are different. In another way, it measures the minimum number of substitutions required to change one pixel string into the other, or the minimum number of errors that could have transformed one pixel string into the other. Zernike polynomials may be used as basis functions of image moments (e.g., Zernike moments). Since Zernike polynomials are orthogonal to each other, Zernike moments can represent properties of an image with no redundancy or overlap of information between the moments. Although Zernike moments may be dependent on the scaling and the translation of the object in a region of interest (ROI), their magnitudes may be substantially independent of the rotation angle of the object. Thus, the Zernike moments can be utilized to extract features from images of the first and second hand that describe the shape characteristics of an object associated with fingers and/or skin of the hands.

The system 200 can also determine a distance between Hu moments by calculating a Hamming distance between Hu moments that describe a finger of the first hand and Hu moments that describe a finger of the second hand.

In some implementations, the system 200 determines a distance between finger-width statistics by first scaling the mean of the finger-width values for the second hand using the estimated lengths of the middle fingers for the first and second hands. After scaling, the system 200 can calculate a Hamming distance between a mean-width vector that describes a finger of the first hand and a mean-width vector that describes a finger of the second hand.

Thus, the first and second hands can have for each corresponding pair of fingers, e.g., index finger of the first hand and index finger of the second hand, one distance value for Zernike moments, one distance value for Hu moments, and one distance value for finger-width statistics.

The system 200 determines respective mean distances for each feature in the collection of features (940). For example, the system 200 can determine a mean Zernike distance using respective Zernike distance values for each of the fingers of the first hand, e.g., distance value for Zernike moments of the index finger, distance value for Zernike moments of the middle finger, distance value for Zernike moments of the ring finger, distance value for Zernike moments of the little finger, and distance value for Zernike moments of the thumb. In some implementations, when determining a distance between Zernike moments, the system 200 can scale the distance by a factor, e.g., by multiplying the distance by a factor of 50,000. In some implementations, Zernike moments and Hu moments that are within a (e.g., predetermined) threshold value, e.g., 0.0001, are ignored. Similarly, the system 200 can determine mean distances for Hu moments and finger-width statistics.

In some examples, a Hu-moment vector for a finger is seven elements long, but only a few values are non-negligible. Accordingly, given two fingers (e.g., a probe finger and a reference finger), the system 200 compares their corresponding Hu vectors, H1 and H2, but first removes those elements that are negligible. For instance, the system 200 forms adjusted Hu vectors, H1' and H2' from H1 and H2, respectively, by only retaining elements that have an absolute value that exceeds a (e.g., predetermined) minimum threshold (e.g., 0.0001). The system 200 then normalizes the adjusted Hu vectors, H1' and H2', to unit length vectors. For instance, the system 200 sums the values in the adjusted Hu vectors, H1' and H2', to arrive at two sum values (e.g., Sum1 for H1' and Sum2 for H2') and then divides each element in the adjusted Hu vectors, H1' and H2', by the corresponding sum (e.g., Sum1 for elements of H1' and Sum2 for elements of H2') to generate normalized Hu vectors, normH1' and normH2'. The system 200 then computes an absolute value of a difference between corresponding elements in the normalized Hu vectors, normH1' and normH2', multiplies each difference by a score factor (e.g., 10,000), and computes a summation of the results. The summation is then divided by the number of non-negligible elements used in arriving at the summation (e.g., the number of elements in the normalized Hu vectors, normH1' and normH2') to compute a Hu score that reflects the similarity of the two fingers with higher values reflecting fingers that have a higher degree of dissimilarity. If all of the elements for a given finger are negligible, the finger is ignored in the calculation.

The system 200 computes a Hu score for each finger pair, as described above, and determines the number of valid scores. If the number of valid scores is zero, the system 200 returns an error, and terminates the matching process with an error condition. If the number of valid scores is one, the system 200 returns the single, valid Hu score. If the number of valid scores is two or three, the system 200 returns the mean of the valid scores. If the number of valid scores is four, the system 200 drops the largest score and the smallest score and returns the mean of the remaining two scores. If the number of valid scores is five (which is the typically expected case), the system 200 drops the largest score and the smallest score and returns the mean of the remaining three scores. The returned Hu score represents a mean distance for Hu moments for the two hands being compared.

As a result, the system 200 will have one mean distance for Zernike moments that corresponds to the first hand, one mean distance for Hu moments that corresponds to the first hand, and one mean distance for finger-width statistics that corresponds to the first hand.

Each respective mean distance for a feature describes a degree of dissimilarity between the first hand and the second hand. In some implementations, the system discards low and high distance values for a feature prior to determining a mean distance for the feature.

The system 200 generates, based on the respective mean distances, a similarity score that measures a similarity between the first hand and the second hand (950). In some implementations, the system 200 generates the similarity score using a similarity function. One example similarity function used to determine the similarity score is reproduced below:

$$S=\max((1000-D_{hu}*k_{hu}),0)+\max((1000-D_z*k_z),0)+\max((500-D_w*k_w),0)$$

where $D_z$ is a mean distance for Zernike moments, $D_{hu}$ is a mean distance for Hu moments, $D_w$ is a mean distance for finger-width statistics, and where $k_z$, $k_{hu}$, and $k_w$ are scale factors, e.g., 5.0, 8.0, and 3.0, respectively.

Note that the constants $k_z$, $k_{hu}$, and $k_w$ are appropriate within the context of the scaling done when the "deltas" were being calculated.

The similarity score represents a degree of similarity between the first hand and the second hand. In some implementations, the system 200 can use the similarity score to determine whether the first hand matches the second hand, for example, by employing a suitable decision logic. The similarity score can also be combined with scores corresponding to one or more different biometric measurements, e.g., measurements of facial features, ears, or eyes leading to Multibiometric Fusion.

FIG. 10 is a schematic diagram of an example of a generic computer system 1000. The system 1000 can be used for the operations described in association with the processes 300, 400, 500, and 900, according to some implementations. The system 1000 may be included in the system 200.

The system 1000 includes a processor 1010, a memory 1020, a storage device 2230, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A biometric verification system comprising:
a computer storage medium; and
at least one processor configured to interact with the computer storage medium to perform operations comprising:
accessing a color image of a hand associated with a person, the color image having been captured by an image capture device;
generating, using the color image, a graylevel image of the hand;
segmenting the graylevel image of the hand generated using the color image into foreground portions and background portions;
segmenting the color image of the hand into foreground portions and background portions; and
combining the segmented graylevel image with the segmented color image based on the foreground portions and background portions of the segmented graylevel image and the foreground portions and background portions of the segmented color image to form a fused image of the hand.

2. The biometric verification system of claim 1, wherein segmenting the graylevel image of the hand into foreground portions and background portions comprises:
applying a threshold-based binarization process to pixels of the graylevel image;
determining a first group of pixels in the graylevel image that satisfies a threshold of the threshold-based binarization process, and designating the first group of pixels as a foreground portion of the graylevel image; and
determining a second group of pixels in the graylevel image that does not satisfy the threshold of the threshold-based binarization process, and designating the second group of pixels as a background portion of the graylevel image.

3. The biometric verification system of claim 1, wherein segmenting the color image of the hand into foreground portions and background portions comprises:
applying a k-means clustering process to pixels of the color image of the hand to generate k clusters of pixels;
determining, for each cluster among the k clusters of pixels, an average RGB value for a center of the cluster;
determining a first group of clusters, among the k clusters, for which the average RGB value for the center of the cluster satisfies a threshold, and designating the first group of clusters as a foreground portion of the color image; and
determining a second group of clusters, among the k clusters, for which the average RGB value for the center of the cluster does not satisfy the threshold, and designating the second group of clusters as a background portion of the color image.

4. The biometric verification system of claim 1, wherein combining the segmented graylevel image with the segmented color image based on the foreground portions and background portions of the segmented graylevel image and the foreground portions and background portions of the segmented color image to form the fused image of the hand comprises:
determining, for a first pixel in the color image and a second pixel in the graylevel image that corresponds to the first pixel, whether at least one of the first pixel or the second pixel is designated in the foreground portions of the color image or the graylevel image; and
based on a determination that at least one of the first pixel or the second pixel is designated in the foreground portions of the color image or the graylevel image:
determining a third pixel in the fused image that corresponds to the first pixel and the second pixel; and
designating the third pixel in a foreground portion of the fused image.

5. The biometric verification system of claim 4, further comprising:
based on a determination that neither the first pixel nor the second pixel is designated in the foreground portions of the color image or the graylevel image:
performing a first comparison between the first pixel in the color image and at least one pixel in the foreground portions of the color image;
performing a second comparison between the second pixel in the graylevel image and at least one pixel in the foreground portions of the graylevel image; and
based on the first comparison and the second comparison, designating the third pixel in a foreground portion of the fused image.

6. The biometric verification system of claim 5, wherein:
performing the first comparison comprises determining a Euclidean distance between the first pixel and a center of a cluster of pixels generated by a k-means clustering process; and
performing the second comparison comprises determining a difference between a value of the second pixel in the graylevel image and a threshold in a threshold-based binarization process.

7. The biometric verification system of claim 1, wherein combining the segmented graylevel image with the segmented color image based on the foreground portions and background portions of the segmented graylevel image and the foreground portions and background portions of the segmented color image to form the fused image, comprises:
determining whether a portion of the fused image corresponds to at least one of a portion of the segmented graylevel image that is segmented into a foreground portion or corresponds to a portion of the segmented color image that is segmented into a foreground portion; and
based on a determination that a portion of the fused image does not correspond to at least one of a portion of the segmented graylevel image that is segmented into a foreground portion or corresponds to a portion of the segmented color image that is segmented into a foreground portion, determining whether a value, of the portion of the segmented graylevel image that is not segmented into a foreground portion, that reflects a likelihood that a portion is a foreground portion satisfies a threshold value and whether a distance between the portion of the segmented color image that is not segmented into a foreground portion and another portion of the segmented color image that is segmented into a foreground portion satisfies a distance threshold; and based on a determination that the value, of the portion of the segmented graylevel image that is not segmented into a foreground portion, that reflects a likelihood that a portion is a foreground portion satisfies the threshold value and that the distance between the portion of the segmented color image that is not segmented into a foreground portion and the other portion of the segmented color image that is segmented into a foreground portion satisfies the distance threshold, designating the portion of the fused image as a foreground portion.

8. A computer-implemented method comprising:
accessing a color image of a hand associated with a person, the color image having been captured by an image capture device;
generating, using the color image, a graylevel image of the hand;
segmenting the graylevel image of the hand generated using the color image into foreground portions and background portions;
segmenting the color image of the hand into foreground portions and background portions; and
combining the segmented graylevel image with the segmented color image based on the foreground portions and background portions of the segmented graylevel image and the foreground portions and background portions of the segmented color image to form a fused image of the hand.

9. The method of claim 8, wherein segmenting the graylevel image of the hand into foreground portions and background portions comprises:
applying a threshold-based binarization process to pixels of the graylevel image;
determining a first group of pixels in the graylevel image that satisfies a threshold of the threshold-based binarization process, and designating the first group of pixels as a foreground portion of the graylevel image; and
determining a second group of pixels in the graylevel image that does not satisfy the threshold of the threshold-based binarization process, and designating the second group of pixels as a background portion of the graylevel image.

10. The method of claim 8, wherein segmenting the color image of the hand into foreground portions and background portions comprises:
applying a k-means clustering process to pixels of the color image of the hand to generate k clusters of pixels;
determining, for each cluster among the k clusters of pixels, an average RGB value for a center of the cluster;
determining a first group of clusters, among the k clusters, for which the average RGB value for the center of the cluster satisfies a threshold, and designating the first group of clusters as a foreground portion of the color image; and
determining a second group of clusters, among the k clusters, for which the average RGB value for the center of the cluster does not satisfy the threshold, and designating the second group of clusters as a background portion of the color image.

11. The method of claim 8, wherein combining the segmented graylevel image with the segmented color image based on the foreground portions and background portions of the segmented graylevel image and the foreground portions and background portions of the segmented color image to form the fused image of the hand comprises:
determining, for a first pixel in the color image and a second pixel in the graylevel image that corresponds to the first pixel, whether at least one of the first pixel or the second pixel is designated in the foreground portions of the color image or the graylevel image; and
based on a determination that at least one of the first pixel or the second pixel is designated in the foreground portions of the color image or the graylevel image:
determining a third pixel in the fused image that corresponds to the first pixel and the second pixel; and
designating the third pixel in a foreground portion of the fused image.

12. The method of claim 11, further comprising:
based on a determination that neither the first pixel nor the second pixel is designated in the foreground portions of the color image or the graylevel image:
performing a first comparison between the first pixel in the color image and at least one pixel in the foreground portions of the color image;
performing a second comparison between the second pixel in the graylevel image and at least one pixel in the foreground portions of the graylevel image; and
based on the first comparison and the second comparison, designating the third pixel in a foreground portion of the fused image.

13. The method of claim 12, wherein:
performing the first comparison comprises determining a Euclidean distance between the first pixel and a center of a cluster of pixels generated by a k-means clustering process; and
performing the second comparison comprises determining a difference between a value of the second pixel in the graylevel image and a threshold in a threshold-based binarization process.

14. The method of claim 8, wherein combining the segmented graylevel image with the segmented color image based on the foreground portions and background portions of the segmented graylevel image and the foreground portions and background portions of the segmented color image to form the fused image, comprises:
determining whether a portion of the fused image corresponds to at least one of a portion of the segmented graylevel image that is segmented into a foreground portion or corresponds to a portion of the segmented color image that is segmented into a foreground portion; and
based on a determination that a portion of the fused image does not correspond to at least one of a portion of the segmented graylevel image that is segmented into a foreground portion or corresponds to a portion of the segmented color image that is segmented into a foreground portion, determining whether a value, of the portion of the segmented graylevel image that is not segmented into a foreground portion, that reflects a likelihood that a portion is a foreground portion satisfies a threshold value and whether a distance between the portion of the segmented color image that is not segmented into a foreground portion and another portion of the segmented color image that is segmented into a foreground portion satisfies a distance threshold; and
based on a determination that the value, of the portion of the segmented graylevel image that is not segmented into a foreground portion, that reflects a likelihood that a portion is a foreground portion satisfies the threshold value and that the distance between the portion of the segmented color image that is not segmented into a foreground portion and the other portion of the segmented color image that is segmented into a foreground portion satisfies the distance threshold, designating the portion of the fused image as a foreground portion.

15. At least one non-transitory computer-readable storage medium encoded with executable instructions that, when executed by at least one processor, cause the at least one processor to perform operations comprising:
   accessing a color image of a hand associated with a person, the color image having been captured by an image capture device;
   generating, using the color image, a graylevel image of the hand;
   segmenting the graylevel image of the hand generated using the color image into foreground portions and background portions;
   segmenting the color image of the hand into foreground portions and background portions; and
   combining the segmented graylevel image with the segmented color image based on the foreground portions and background portions of the segmented graylevel image and the foreground portions and background portions of the segmented color image to form a fused image of the hand.

16. The storage medium of claim 15, wherein segmenting the graylevel image of the hand into foreground portions and background portions comprises:
   applying a threshold-based binarization process to pixels of the graylevel image;
   determining a first group of pixels in the graylevel image that satisfies a threshold of the threshold-based binarization process, and designating the first group of pixels as a foreground portion of the graylevel image; and
   determining a second group of pixels in the graylevel image that does not satisfy the threshold of the threshold-based binarization process, and designating the second group of pixels as a background portion of the graylevel image.

17. The storage medium of claim 15, wherein segmenting the color image of the hand into foreground portions and background portions comprises:
   applying a k-means clustering process to pixels of the color image of the hand to generate k clusters of pixels;
   determining, for each cluster among the k clusters of pixels, an average RGB value for a center of the cluster;
   determining a first group of clusters, among the k clusters, for which the average RGB value for the center of the cluster satisfies a threshold, and designating the first group of clusters as a foreground portion of the color image; and
   determining a second group of clusters, among the k clusters, for which the average RGB value for the center of the cluster does not satisfy the threshold, and designating the second group of clusters as a background portion of the color image.

18. The storage medium of claim 15, wherein combining the segmented graylevel image with the segmented color image based on the foreground portions and background portions of the segmented graylevel image and the foreground portions and background portions of the segmented color image to form the fused image of the hand comprises:
   determining, for a first pixel in the color image and a second pixel in the graylevel image that corresponds to the first pixel, whether at least one of the first pixel or the second pixel is designated in the foreground portions of the color image or the graylevel image; and
   based on a determination that at least one of the first pixel or the second pixel is designated in the foreground portions of the color image or the graylevel image:
      determining a third pixel in the fused image that corresponds to the first pixel and the second pixel; and
      designating the third pixel in a foreground portion of the fused image.

19. The storage medium of claim 18, further comprising:
   based on a determination that neither the first pixel nor the second pixel is designated in the foreground portions of the color image or the graylevel image:
      performing a first comparison between the first pixel in the color image and at least one pixel in the foreground portions of the color image;
      performing a second comparison between the second pixel in the graylevel image and at least one pixel in the foreground portions of the graylevel image; and
      based on the first comparison and the second comparison, designating the third pixel in a foreground portion of the fused image.

20. The storage medium of claim 15, wherein combining the segmented graylevel image with the segmented color image based on the foreground portions and background portions of the segmented graylevel image and the foreground portions and background portions of the segmented color image to form the fused image, comprises:
   determining whether a portion of the fused image corresponds to at least one of a portion of the segmented graylevel image that is segmented into a foreground portion or corresponds to a portion of the segmented color image that is segmented into a foreground portion; and
   based on a determination that a portion of the fused image does not correspond to at least one of a portion of the segmented graylevel image that is segmented into a foreground portion or corresponds to a portion of the segmented color image that is segmented into a foreground portion, determining whether a value, of the portion of the segmented graylevel image that is not segmented into a foreground portion, that reflects a likelihood that a portion is a foreground portion satisfies a threshold value and whether a distance between the portion of the segmented color image that is not segmented into a foreground portion and another portion of the segmented color image that is segmented into a foreground portion satisfies a distance threshold; and
   based on a determination that the value, of the portion of the segmented graylevel image that is not segmented into a foreground portion, that reflects a likelihood that a portion is a foreground portion satisfies the threshold value and that the distance between the portion of the segmented color image that is not segmented into a foreground portion and the other portion of the segmented color image that is segmented into a foreground portion satisfies the distance threshold, designating the portion of the fused image as a foreground portion.

* * * * *